Figure 1:
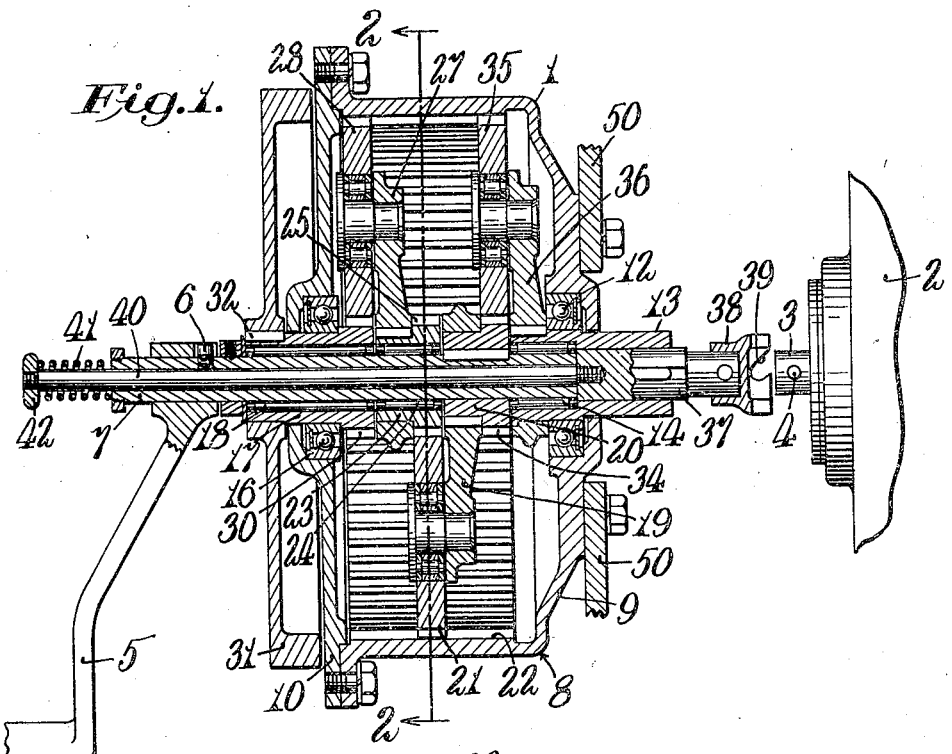

May 26, 1936.   C. O. NYGREN   2,041,722
ENGINE STARTING APPARATUS
Filed Dec. 26, 1931

Inventor:
CARL O. NYGREN.
By Louis A. Mason.
Atty.

Patented May 26, 1936

2,041,722

UNITED STATES PATENT OFFICE 2,041,722

ENGINE STARTING APPARATUS

Carl O. Nygren, Michigan City, Ind., assignor to Sullivan Machinery Company, a corporation of Massachusetts Application December 26, 1931, Serial No. 583,316

22 Claims. (Cl. 123—179)

My invention relates to engine starting apparatus for the starting of engines such as airplane engines, engines for driving portable compressors, or the like, and the object thereof is to provide a simple, efficient and reliable apparatus characterized by the provision of an improved combination of reduction means such as epicyclic or planetary gearing, and inertia means, such as a flywheel, which is put into high speed rotation by suitable means, either manual or power, or both, and then connected, through suitable means, advantageously including devices for multiplying mechanical advantage, in cranking relationship with the engine to be started.

In a preferred embodiment, my improved mechanism comprises a drive or transmission including an element which is adapted to be coupled to and crank a member of the engine to be started, inertia means such as a flywheel, gearing such as planetary or epicyclic gearing connected with the inertia means for storing energy in the latter and transmitting the stored energy to the drive aforesaid, and rotating means for actuating said gearing and flywheel. In a preferred form, the drive or transmission may include in itself reduction gearing possessing, when in motion, substantial momentum, and thus increasing the torque for starting purposes both by increasing mechanical advantage and adding, though perhaps only in small measure, to the total kinetic energy available. Whether the transmission or drive connect an alined starting apparatus and engine crank shaft, or be modified to connect parallel starting and engine shafts, is obviously a matter of selection and, in either form, within the scope of my invention.

In the accompanying drawing I have shown, for purposes of illustration, one embodiment which my invention may assume in practice. In the drawing,—

Figure 2:
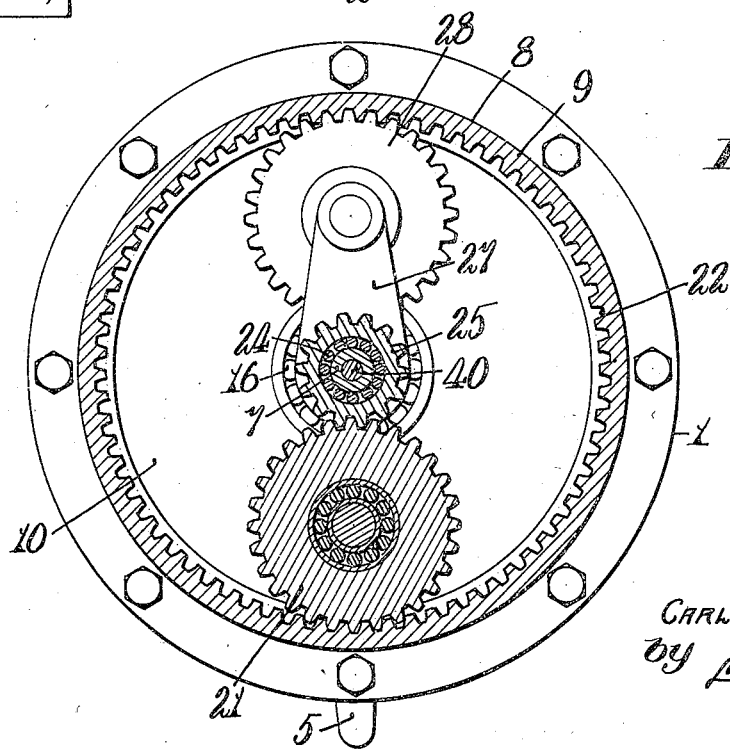

Fig. 1 is a central longitudinal section through an apparatus embodying the illustrative form of my invention, and Fig. 2 is a transverse section on a plane corresponding to the line 2—2 of Fig. 1.

The engine starter as a whole is designated 1, and a fragment of the engine to be started is shown at 2. The engine has a crank shaft 3 provided with a pin 4 to which starting torque is to be applied. The starter 1 is herein shown as alined with the engine, but might obviously be arranged in parallel or laterally offset relation to it and connected with it through gearing, chain and sprocket connections, or the like.

Herein, for simplicity, only manual starting means for actuating the gearing and flywheel is shown. A hand crank 5 connected by a pin and slot connection 6 with a hollow shaft 7 is rotatable to drive the latter, which extends axially of a starter casing 8. A motor drive is obviously possible.

The casing 8 includes a shell portion 9 and cover plate 10, and each of these parts provides a support for a bearing. The bearing 12 in the shell portion provides a journal for a sleeve 13, which in turn houses a bearing 14 in which the hollow shaft 7 is journaled. The bearing 16 in the cover plate 10 provides a journal for a sleeve 17 which houses another bearing 18 for the hollow shaft 7.

The gearing actuated by the starting means and adapted to drive the inertia means includes an arm 19 keyed or otherwise held to a sleeve 20 which is keyed to the hollow shaft 7 near the bearing 14. The arm 19 carries a gear 21 journaled thereon and rolling, upon movement of the arm around the axis of the shaft 7, in mesh with a series of internal spur teeth 22, herein formed on the interior of the housing member 9 and forming a reaction gear. A sleeve 23 is rotatably mounted at 24 upon the shaft 7 and carries a spur gear 25 meshing with the gear 21, and also carries a radial arm 27 which rotatably supports a spur gear 28 meshing with the internal gear teeth 22. The gear 28 meshes with the teeth of a gear 30 fixed with respect to the sleeve 17.

The inertia means or flywheel 31 is keyed at 32 to the sleeve 17.

Torque transmitted back from the inertia means to the sleeve 20 is transmitted to the crank shaft 3 by a drive or transmission including a spur gear 34 in fixed relation to the sleeve 20, meshing with a gear 35 rotatably carried by an arm 36, which is keyed to the sleeve 13. The gear 35 also meshes with the internal teeth 22. Within the sleeve 13 and splined thereto is a slidable member 37 carrying a terminal connector element 38 with helical slots 39 for cooperation with the pin 4. The member 37 is movable to connect the sleeve 13 with the shaft 3, by a push rod 40 mounted in the hollow shaft 7 and normally maintained in retracted position by a spring 41 engaging a button 42 on the end of the rod 40. Obviously, rotation by the hand crank 5 of the shaft 7 not only stores energy in the flywheel 31 and transmission thereto, but also sets in motion the drive last described.

The mode of operation of the mechanism described and shown in detail may be summarized as follows. When it is desired to start the engine 2, the crank 5 is turned and through the connection 6 drives the hollow shaft 7. Rotation of the shaft 7 turns the arm 19, and gear 21 is thus caused to rotate on its axis through engagement with the internal teeth 22. Gear 25, meshing with gear 21, therefore revolves at a considerably higher speed than shaft 7 and causes arm 27 to turn faster than arm 19. The gear 28 is therefore rotated at a still higher speed and drives the gear 30 at quite a high speed, thus causing high speed rotation of the flywheel. Meanwhile the arm 36 and sleeve 13 are being caused to rotate at a relatively slow speed. When sufficient energy is stored in the flywheel, pressure on the button 42 will move the rod 40 and member 37 to connect coupling 38, 39 with pin 4; and the flywheel will transmit, through all of the reduction gearing in the two drives, a very powerful starting torque to the engine to be started. When the engine starts, the connection 39, 4 will be automatically broken.

Obviously, any suitable mounting of the starter would be possible, and a mounting is here merely indicated at 50. A mounting on the engine frame or on the frame supporting the engine would be satisfactory in the event that a starter is to be mounted as an accessory of a particular engine.

The arrangement hereof is strong, reliable, and efficient, readily cranked to store energy, and transmits a very powerful rotating force to the engine to be started.

While I have in this application specifically described one form which the invention may assume in practice, it will be understood that this form is shown for purposes of illustration and that the invention may be modified and embodied in various other forms without departing from its spirit or the scope of the appended claims.

What I claim as new and desire to secure by Letters Patent is:—

1. An engine starter having a drive including a driving member adapted to drive a member of an engine to be started and including reduction gearing, an inertia member, reduction gearing for connecting said inertia member with said drive, and means for transmitting rotation to said inertia member through only the second mentioned reduction gearing, said first mentioned reduction gearing including exclusively gears distinct from the gears of said second mentioned reduction gearing, and all of which rotate at slower angular rates than any of the gears of said second mentioned reduction gearing.

2. An engine starter having a terminal element connectible to an engine to be started, an inertia member, reduction gearing for transmitting energy to and from the latter including a plurality of gears, starting means for actuating said reduction gearing, and reduction gearing also rotated by said starting means but distinct from said first mentioned reduction gearing and including gears all of which rotate at angular rates different from those of said plurality of gears, for connecting said first mentioned reduction gearing with said terminal element.

3. In an engine starter, a flywheel, reduction gearing for transmitting energy to said flywheel including a reaction gear concentric with said flywheel, and reduction gearing distinct from the reduction gearing for transmitting energy to said flywheel, for transmitting torque from said first mentioned reduction gearing to the engine to be started and including a gear meshing with said reaction gear.

4. In an engine starter, a flywheel, reduction gearing for transmitting energy to said flywheel including a reaction gear, and reduction gearing for transmitting torque only from said first mentioned reduction gearing to the engine to be started and including a gear meshing with said reaction gear.

5. In an engine starter, a starting shaft to be turned to render said starter effective, means for rotating said starting shaft, means rotated by said starting shaft for storing energy including reduction gearing and an inertia member, and a speed reducing gear drive for connecting said reduction gearing to an engine to be started also rotated by said starting shaft and including a gear element carried by the latter.

6. In an engine starter, a starting shaft, means for rotating the same, means rotated thereby for storing energy including reduction gearing and an inertia member, and a speed reducing gear drive for connecting said reduction gearing to an engine to be started also rotated by said starting shaft, said starting shaft carrying elements individual to said reduction gearing and to said speed reducing gear drive respectively.

7. In an engine starter, a rotatable shaft, driving means for said shaft, a gear coaxial with said shaft, means for holding said gear against rotation, a flywheel, speed changing power transmission means for transmitting rotation from said shaft to said flywheel at a higher angular rate than that of said shaft including at least one arm rotatable about the axis of said shaft and carrying a gear meshing with said first mentioned gear and traveling orbitally with its axis moving around the axis of said first mentioned gear as an axis, mechanism independent of said power transmission means and rotatable by an element of the latter including another arm rotatable about the axis of said shaft and also carrying a gear meshing with said first mentioned gear and a gear meshing with said last mentioned gear, and means rotatable by said last mentioned arm optionally operative to transmit a starting torque to an engine to be started.

8. In an engine starter, a rotatable shaft, driving means for said shaft, an internal gear coaxial with said shaft, means for holding said gear against rotation, an arm carried by said shaft and rotated at an equal angular rate therewith and carrying a gear meshing with said internal gear, gearing rotatable by said second mentioned gear, a flywheel rotatable by said gearing, a gear fixed to said shaft, a gear driven thereby and meshing with said internal gear, an arm carrying said fourth mentioned gear, and means rotatable by said arm and including an optionally connectible clutch for transmitting a starting torque to an engine to be started.

9. In an engine starter, a rotatable shaft, driving means for said shaft, a gear coaxial with said shaft, means for holding said gear against rotation, a flywheel, speed changing power transmission means for transmitting rotation from said shaft to said flywheel at a higher angular rate than that of said shaft including at least one arm rotatable about the axis of said shaft and carrying a gear meshing with said first mentioned gear and traveling orbitally with its axis moving around the axis of said first mentioned gear as an axis, another arm rotatable relative to said first mentioned arm about the axis of said shaft and also carrying a gear meshing with said first mentioned gear, a gear meshing with said last mentioned gear and rotatable by an element of said power transmission means, and means rotatable by said last mentioned arm optionally operative to transmit a starting torque to an engine to be started.

10. In an engine starter, a rotatable hollow shaft, driving means for said shaft, an internal gear coaxial with said shaft, means for holding said gear against rotation, an arm carried by said shaft and rotated at an equal angular rate therewith and carrying a gear meshing with said internal gear, gearing rotatable by said second mentioned gear, a flywheel rotatable by said gearing, a gear fixed to said shaft, a gear driven thereby and meshing with said internal gear, an arm carrying said fourth mentioned gear, and means rotatable by said arm for transmitting a starting torque to an engine to be started and having a drive control element extending through said hollow shaft.

11. In an engine starter, a rotatable hollow shaft, driving means for said shaft, an internal gear coaxial with said shaft, means for holding said gear against rotation, an arm fixedly carried by said shaft and carrying a gear meshing with said internal gear, gearing rotatable by said second mentioned gear, a flywheel rotatable by said gearing independent of said flywheel rotating gearing and actuated by said flywheel through said flywheel rotating gearing, said independent gearing including, a gear fixed to said shaft, a gear driven thereby and meshing with said internal gear and an arm carrying said fourth mentioned gear, and means rotatable by said arm for transmitting a starting torque to an engine to be started including a slidable connector device and means for sliding the same extending through said hollow shaft.

12. An engine starter including, in combination, an inertia member, an actuating member to be turned to render said starter effective, a train of gearing actuated by said actuating member for rotating said inertia member to store energy in the latter, a member connectible to drive an engine to be started, and reduction gearing providing a stage separate from said train of gearing but actuated thereby for imparting an increased torque to said member, all the gearing in said train effective in the driving by said inertia member of the member connectible to drive an engine to be started and said train providing a much greater difference in rate of angular rotation between its terminal elements than said reduction gearing provides between the latter's respective terminal elements.

13. An engine starter including, in combination, a driving member connectible to an engine to start the latter, an inertia member, multistage reduction gearing for transmitting rotation from said inertia member to said driving member, and means for imparting energy to said starter for storage in said inertia member driven only through a portion of said production gearing and operatively connected with said reduction gearing at a part thereof whose rotative speed is different from both that of the driving member and that of the inertia member but materially nearer that of said driving member, whereby storage of energy in said inertia member is facilitated without proportional reduction in torque transmissible to the driving member.

14. An engine starter including, in combination, a plural stage speed changing gear train including a plurality of elements rotating at different angular rates, an inertia member connected for rotation by and to transmit rotation to the highest speed element of said speed changing gearing, a driving member connectible to an engine to start the latter and connected with an element of said speed changing gearing which is rotatable at a slower speed than the highest speed element of said gearing, and means for imparting energy to said starter for storage in said inertia member connected with an element of said speed changing gearing whose rotative speed is intermediate that of said highest speed element and that of said element connected to said driving member and which last mentioned element is intermediate, in said gear train, said highest speed element and said second mentioned element and coaxial with said inertia member, said inertia member rotated by said energy-imparting means through certain elements of said gear train independent of said element connected with said driving member.

15. An engine starter including, in combination, a plural stage speed changing gear train including a plurality of elements rotating at different angular rates, an inertia member connected for rotation by and to transmit rotation to the highest speed element of said speed changing gearing, a driving member connectible to an engine to start the latter and connected with an element of said speed changing gearing which is rotatable at a slower speed than the highest speed element of said gearing, and means for imparting energy to said starter for storage in said inertia member and connected with an element of said speed changing gearing whose rotative speed is intermediate that of said highest speed element and that of said element connected to said driving member and which last mentioned element is intermediate, in said gear train, said highest speed element and said second mentioned element and coaxial with said driving member, said inertia member rotated by said energy-imparting means through certain elements of said gear train independently, as regards power transmission to said inertia member, of said element connected with said driving member.

16. An engine starter including, in combination, a plural stage speed changing mechanism including coaxial members arranged in train and of which when one is rotating at one speed, a second rotates at a different speed, and a third at a still different speed, the speed of the second mentioned member being intermediate the speeds of the first and third, an inertia member operatively connected with one of said coaxial members, a driving device for imparting energy to said starter for storage in said inertia member, operatively connected with the second of said coaxial members, and a driving member connectible to an engine to start the latter operatively connected with the third of said coaxial members, said inertia member rotated by said driving device through said first and second coaxial members independently, as regards power transmission to said inertia member, of said third coaxial member.

17. An engine starter including, in combination, a plural stage speed changing mechanism including coaxial gear members arranged in train and of which when one is rotating at one speed, a second rotates at a different speed, and a third at a still different speed, an inertia member operatively connected with one of said coaxial gear members to rotate at the same angular rate with the latter, a driving device for imparting energy to said starter for storage in said inertia member, operatively connected with the second of said coaxial gear members through power transmitting connections of which said first and third coaxial gear members form no part, and a driving member connectible to an engine to start the latter operatively connected with the third of said coaxial gear members, said second mentioned coaxial gear member being an intermediate member, in said speed changing train, between said first and third coaxial gear members.

18. An engine starter including, in combination, a plural stage speed changing mechanism including coaxial members each carrying a planet carrying arm and arranged in train and of which when one is rotating at one speed, a second rotates at a different speed, and a third at a still different speed, an inertia member operatively connected with one of said coaxial members, a driving device for imparting energy to said starter for storage in said inertia member, operatively connected with the second of said coaxial members, and a driving member connectible to an engine to start the latter operatively connected with the third of said coaxial members.

19. An engine starter including, in combination, a plural stage speed changing gearing including a plurality of planet carrying arms and a single gear element having teeth meshing with the teeth of the planets on said several arms, an inertia device connected for rotation by and to effect rotation of one of said arms, a driving member connectible to an engine to start the latter and connected with another of said arms, and means for imparting energy to the starter for storage in said inertia member operatively connected with a third arm, said last mentioned arm lying between the first and second mentioned arms.

20. An engine starter including, in combination, a plural stage speed changing gearing including a plurality of coaxial gears, a plurality of relatively rotatable arms each carrying a planet individual to and engaging one of said coaxial gears, gear means coaxial with said coaxial gears and engaged by said several planets, an inertia member secured to one of said coaxial gears, a driving member connectible to an engine to start the latter and operatively connected to another of said coaxial gears for rotation thereby, and means for imparting to the third of said coaxial gears energy for storage in said inertia member, to be delivered when desired to said driving member.

21. An engine starter including, in combination, a plural stage speed changing mechanism including coaxial gear members arranged in train and of which when one is rotating at one speed a second rotates at a different speed and a third at a still different speed, an inertia member having with said first mentioned one of said coaxial members a power transmitting connection of which said second and third mentioned coaxial members form no part, a driving device for imparting energy to the starter for storage in said inertia member and having a power transmitting connection with the second of said coaxial members of which said first and third mentioned coaxial members form no part, and a driving member connectible to an engine to start the latter and operatively connected with the third of said coaxial members, said inertia member arranged at the opposite side of said first mentioned coaxial member from said third mentioned coaxial member.

22. An engine starter including, in combination, a plural stage speed changing mechanism including coaxial gear members arranged in train and of which when one is rotating at one speed a second rotates at a different speed and a third at a still different speed, said second mentioned member arranged in the power transmission train between the first and third mentioned members, an inertia member having with said first mentioned one of said coaxial members a power transmitting connection of which said second and third mentioned coaxial members form no part, a driving device for imparting energy to the starter for storage in said inertia member having a power transmitting connection with the second of said coaxial members of which said first and third mentioned coaxial members form no part, and a driving member connectible to an engine to start the latter and operatively connected with the third of said coaxial members for rotation thereby.

CARL O. NYGREN.

CERTIFICATE OF CORRECTION.

Patent No. 2,041,722.

May 26, 1936.

CARL O. NYGREN.

It is hereby certified that error appears in the printed specification of the above numbered patent requiring correction as follows: Page 3, first column, line 27, claim 11, before "independent" insert the comma and word , gearing; and line 30, same claim, strike out the comma after "including"; and that the said Letters Patent should be read with these corrections therein that the same may conform to the record of the case in the Patent Office.

Signed and sealed this 11th of August, A. D. 1936.

Henry Van Arsdale

Acting Commissioner of Patents.

(Seal)